US009098529B1

(12) United States Patent
Seth et al.

(10) Patent No.: US 9,098,529 B1
(45) Date of Patent: Aug. 4, 2015

(54) DETERMINING CONTENT FOR DELIVERY BASED ON IMAGERY

(75) Inventors: Rohan Seth, San Francisco, CA (US);
Joshua J. Sacks, San Carlos, CA (US);
Michele Covell, Palo Alto, CA (US);
Michael Chu, Los Altos Hills, CA (US);
Shumeet Baluja, Leesburg, VA (US);
David Marwood, San Francisco, CA (US)

(73) Assignee: Google Inc., Mountain View, CA (US)

( * ) Notice: Subject to any disclaimer, the term of this patent is extended or adjusted under 35 U.S.C. 154(b) by 824 days.

(21) Appl. No.: 13/115,438

(22) Filed: May 25, 2011

(51) Int. Cl.
*G06F 17/30* (2006.01)

(52) U.S. Cl.
CPC ............................ *G06F 17/30241* (2013.01)

(58) Field of Classification Search
CPC ................................................. G06F 17/30241
USPC .......................................................... 707/780
See application file for complete search history.

(56) References Cited

U.S. PATENT DOCUMENTS

| 2007/0136259 | A1* | 6/2007 | Dorfman et al. .................. 707/3 |
| 2008/0320036 | A1* | 12/2008 | Winter ...................... 707/103 R |
| 2009/0210388 | A1* | 8/2009 | Elson et al. ....................... 707/3 |

* cited by examiner

*Primary Examiner* — Huawen Peng
(74) *Attorney, Agent, or Firm* — Dority & Manning, P.A.

(57) ABSTRACT

Methods, systems, and computer program products are provided for determining content items for delivery to users based on imagery. One example method includes determining a location of a user or a location associated with a query submitted by the user, identifying imagery associated with the determined location, and determining one or more content items for delivery to the user based at least in part on the imagery.

20 Claims, 6 Drawing Sheets

DETERMINING CONTENT FOR DELIVERY BASED ON IMAGERY

BACKGROUND

This specification generally relates to information presentation.

Users of the Internet and of search engines can use such tools to perform research and to find information of interest. Satellites and street-level cameras can capture images of locations around the world and deliver such in the form of imagery to a user, such as a user of a computing device or mobile device.

SUMMARY

In general, one innovative aspect of the subject matter described in this specification may be embodied in methods, systems, and computer program products for determining content items for delivery to users based on imagery. One example method includes determining a location of a user or a location associated with a query submitted by the user, identifying imagery associated with the determined location, and determining one or more content items for delivery to the user based at least in part on the imagery.

In general, another innovative aspect of the subject matter described in this specification may be embodied in targeting systems that include location identifiers, imagery identifiers, feature identifiers, location classifiers, and content selectors. A location identifier can determine a location of a user or a location associated with a query submitted by the user. An imagery identifier can identify imagery associated with the determined location. A feature identifier can determine one or more features associated with the location based on the on the identified imagery. A location classifier can determine one or more classifications for the location. A content selector can determine one or more content items for delivery to the user based at least in part on one or more features determined by the feature identifier or one or more classifications for the location determined by the location classifier.

These and other embodiments may each optionally include none, one or more of the following features. In various examples, the imagery can be satellite imagery. The imagery can be aerial imagery. The imagery can be street view imagery. The imagery can be thermal imagery. A location associated with a query can be a location that is included in query terms of the query. The location of the user can be a location associated with a device employed by the user. The location of the device can be inferred based on an internet protocol address of the device. Identifying imagery associated with the determined location can include identifying historical imagery and determining one or more content items can be based at least in part on comparing imagery associated with various time periods. Determining one or more content items can include determining one or more advertisements for delivery to the user.

One or more features associated with the location can be determined based on the imagery and determining one or more content items can be based at least in part on the one or more features. The features can be physical features associated with the location. The features can include features such as ruggedness, forestation, grass coverage, water coverage, snow coverage, commercial development, residential development, agricultural development, recreational development, or transportation infrastructure development.

One or more similar locations can be determined based on the imagery, one or more content items previously selected for delivery to users associated with the one or more similar locations can be determined, and determining the one or more content items for delivery to the user can be based at least in part on the one or more content items previously selected for delivery to users associated with the one or more similar locations. Determining one or more similar locations can include classifying the location, classifying the one or more similar locations, and comparing the classifications. Classifying can be performed by a user, such as a user associated with the location. Classifying can be performed by a computer.

The location can be classified and determining one or more content items for delivery can include determining one or more content items that have been selected for delivery to users associated with similar locations. The location can be classified and one or more content items can be delivered based on the classification. The classification can be based on current weather conditions associated with the location, land use associated with the location, population density associated with the location, or environmental conditions associated with the location.

Particular embodiments of the subject matter described in this specification may be implemented to realize none, one or more of the following advantages. Targeted information can be delivered to a user based on location information determined for the user and imagery information associated with the location.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In general, a system provides content to users based on imagery associated with user locations or locations of interest to users. Physical features included in imagery can be identified, and locations can be classified. Multiple locations can be compared, and content items of interest to users located in or interested in particular locations can be provided to users located in or interested in similar locations.

The systems discussed here may provide one or more mechanisms for collecting information about users. Users may be provided with an opportunity to opt in/out of programs that may collect personalized information. In addition, certain data may be anonymized in one or more ways before it is stored or used, so that personally identifiable data is removed.

Figure 1:
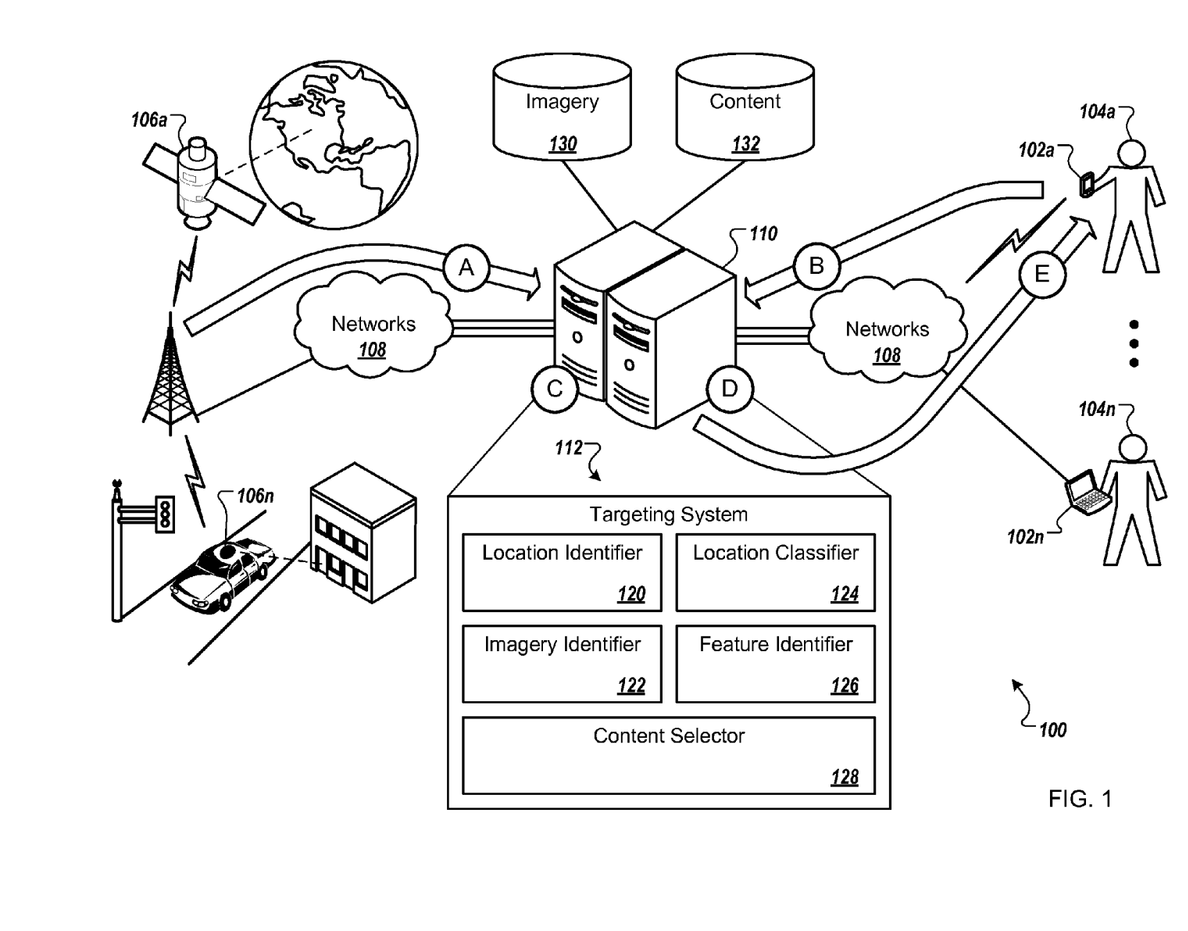
FIG. 1 is a diagram of an example system that can determine content for delivery to users based on imagery.

FIG. 1 is a diagram of an example system 100 that can determine content for delivery to users based on imagery. FIG. 1 also illustrates an example flow of data within the system 100 during states (A) to (E), where the states (A) to (E)

may occur in the illustrated sequence, or they may occur in a sequence that is different than in the illustrated sequence.

In further detail, the system 100 includes one or more client computing devices 102 (each operated by a corresponding user 104) and one or more imagery collection devices 106 that communicate over one or more networks 108 with one or more computing servers 110. The networks 108 may include a wireless cellular network, a wireless local area network (WLAN) or WiFi network, a Third Generation (3G) or Fourth Generation (4G) mobile telecommunications network, or any other network or any appropriate combination thereof.

The client device(s) 102 may be any suitable type of computing device (e.g., mobile phone, smart phone, PDA, music player, e-book reader, tablet computer, laptop or desktop computer, or other stationary or portable device) that includes one or more processors and computer readable media. Among other components, for example, the client device(s) 102 includes one or more processors, computer readable media that store software applications, input device(s) (e.g., touch screens, keyboards, computer mice, motion sensors, microphones, and the like), output device(s) (e.g., display screens, speakers, and the like), and communications interfaces.

The imagery collection device(s) 106 may include any suitable types of devices for collecting imagery information and for transmitting such information via networks 108 to the computing server(s) 110. Imagery information, for example, may include information associated with visual and/or thermal images. In the present example, imagery device 106a (e.g., a satellite) can collect and transmit satellite imagery. As another example, imagery device 106n (e.g., a camera-equipped vehicle) can collect and transmit street view imagery. In some implementations, other types of imagery (e.g., aerial imagery) may be collected and transmitted by other types of imagery collection devices (e.g., sensor-equipped airplanes, helicopters, or balloons). In some implementations, imagery information may be stored by imagery collection device(s) 106 for retrieval and use. For example, imagery device 106n (e.g., the camera-equipped vehicle) can include one or more computer-readable media (e.g., hard drives) for storing imagery information collected by the device and for providing such information to the computing server(s) 110.

The computing server(s) 110 may be configured to execute application code associated with a variety of software components (e.g., modules, objects, libraries, services, and the like), including computer instructions to perform the method steps described below. In some implementations, the computing server(s) 110 may include one or more components of a targeting system 112 described below.

The targeting system 112 for targeting content to users can include a location identifier 120, an imagery identifier 122, a location classifier 124, a feature identifier 126, and a content selector 128. Two or more of the components 120, 122, 124, 126, and 128 may be implemented on the same device (e.g., same computing device), or on different devices, such as devices included in a server farm or a peer-to-peer network. The targeting system 112 and server(s) 110 can be in communication with one or more data storage devices, including an imagery data store 130 and a content data store 132. The data stores 130, 132 can implement databases, file systems, and the like to add, remove, and maintain data used by the system 100.

Referring to the example flow of data, during state (A), imagery information can be received. For example, imagery information can be collected by imagery collection device(s) 106 and transmitted to the computing server(s) 110 or targeting system 112 via network(s) 108. In some implementations, the imagery information can be stored and maintained by the imagery data store 130 for use in further processing. In some implementations, imagery information from multiple sources can be correlated. For example, satellite, aerial, and/or street view imagery information associated with a location can be correlated to supplement information pertaining to the location.

During state (B), location information can be received. For example, location information can be provided by client computing device(s) 102 and transmitted to the computing server(s) 110 via network(s) 108. Location information can include user location information and can include location information associated with queries submitted by users. User location information can be provided, for example, by GPS (Global Positioning System) capabilities of the client computing device 102a, by direct location reporting of the user 104a (e.g., via a location reporting application executed by the device 102a), or by any other suitable technique. As another example, the user 104a may employ the client computing device 102a to enter a search query or a map search. Upon receiving user location information or user-submitted query information, for example, the computing server(s) 110 can provide such information to the location identifier 120, where relevant locations may be determined.

During state (C), imagery associated with the determined location can be identified. For example, imagery information from the imagery data store 130 (or from information provided by imagery collection devices 106 in real-time) can be accessed by the computing server(s) 110 and provided to the imagery identifier 122. In some implementations, the location can be classified and/or features associated with the location can be determined based on the imagery. For example, location and imagery information can be provided to the location classifier 124, and the location can be classified based on factors such as current weather conditions, land use, population density, environmental conditions, and other features associated with the location. Location features can be determined by the feature identifier 126, for example, and can include physical features such as ruggedness, forestation, coverage (e.g., grass, water, snow), and development (e.g., commercial, residential, agricultural, recreational, transportation infrastructure).

During state (D), content items can be determined for delivery to users. For example, the content selector 128 can select one or more content items (e.g., text, images, audio, video, search results, recommendations, advertisements, etc.) from the content data store 132 for delivery to the user 104a, based at least in part on imagery associated with the determined location. In general, content items may be selected that may be of interest to users. For example, if imagery associated with a location (e.g., current location, home, workplace) of the user 104a indicates that the location currently has snow coverage, the content selector 128 may select content (e.g., advertisements) associated with snow (e.g., winter coats). As another example, if imagery associated with the user location suggests that the snow coverage is recent (i.e., snow coverage was identified from recent imagery but was not identified from less recent imagery), the content selector 128 may select other content associated with snow, such as for snow shovels. As another example, if imagery associated with the user location has had snow coverage for several months, the content selector 128 may select content associated with warm-weather vacation destinations.

During state (E), content items can be received by and presented to users. For example, the computing server(s) 110 can provide one or more content items to the client computing device 102a for presentation to the user 104a. Presentation of content to users can include using visual, auditory, and/or tactile output capabilities of the client computing devices 102. In some implementations, content (e.g., recommendations, advertisements) may be presented in association with search results. Thus, for example, imagery associated with user locations and/or search query locations can be used to influence content selected for display to users.

FIGS. 2-7 illustrate examples of imagery. In some implementations, the sorts of imagery illustrated in FIGS. 2-7 may be based on information collected by imagery collection devices 106 (shown in FIG. 1). Imagery can include satellite, aerial, and street view imagery, for example, and may be based on information associated with visual and/or thermal images. In some implementations, coarse satellite images (e.g., five meters per pixel) collected at low frequency (e.g., weekly) may be used. In some implementations, imagery may be based on more detailed and/or more frequent images.

Figure 2:
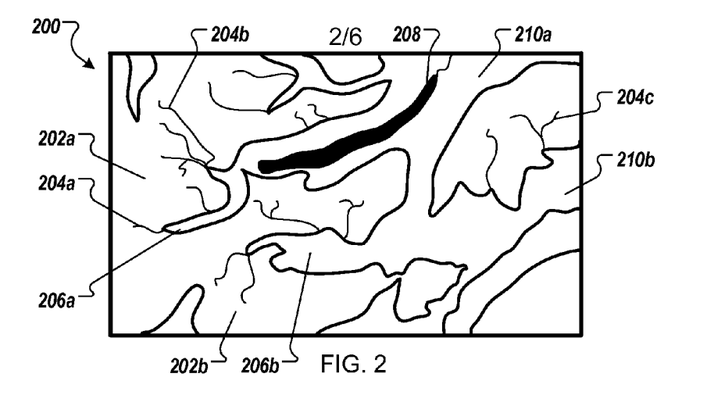
FIGS. 2-7 illustrate examples of imagery.

FIG. 2 illustrates an example of imagery 200 associated with a mountainous region. For example, the imagery 200 can include physical features such as rugged, snow-covered areas 202, streams 204, valleys 206, a lake 208, and forested areas 210.

Figure 3:
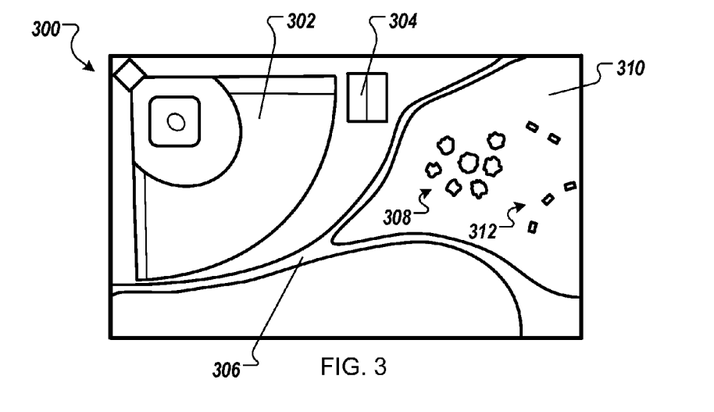

FIG. 3 illustrates an example of imagery 300 associated with a park. For example, the imagery 300 can include physical features such as a baseball diamond 302, a tennis court 304, a trail 306, a grove of trees 308, a grass-covered area 310, and a group of picnic benches 312.

Figure 4:
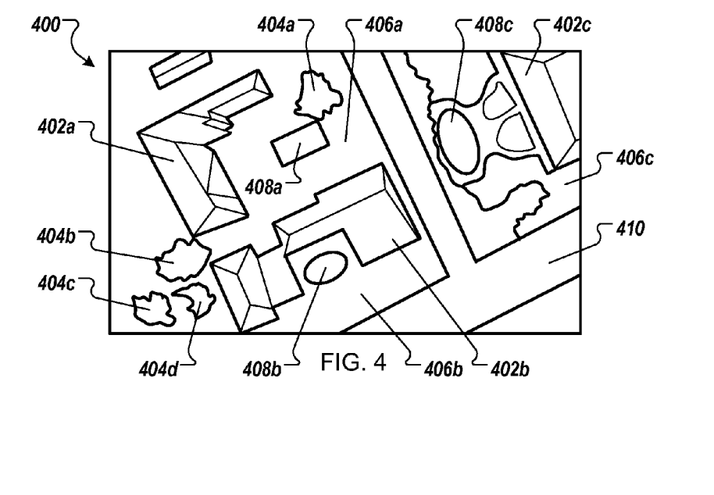

FIG. 4 illustrates an example of imagery 400 associated with a residential area. For example, the imagery 400 can include physical features such as houses 402, trees 404, lawns 406, swimming pools 408, and a street 410.

Figure 5:
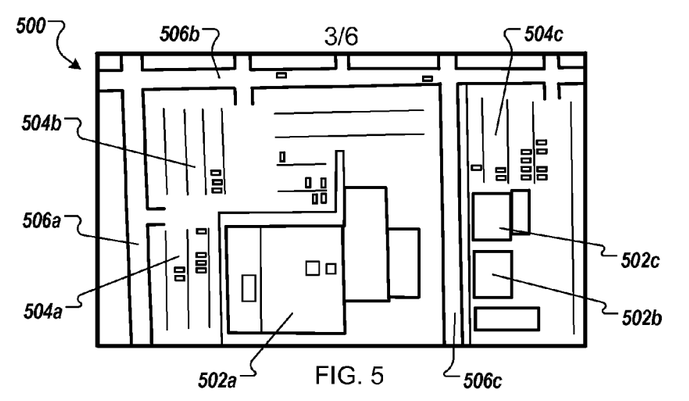

FIG. 5 illustrates an example of imagery 500 associated with a commercial area. For example, the imagery 500 can include physical features such as commercial buildings 502, parking lots 504, and streets 506.

Figure 6:
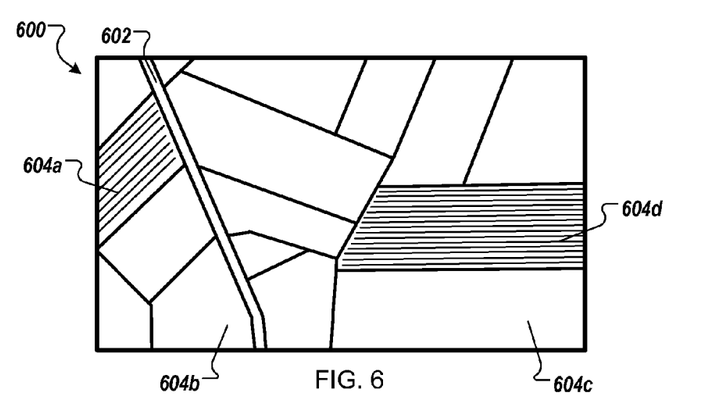

FIG. 6 illustrates an example of imagery 600 associated with an agricultural area. For example, the imagery 600 can include physical features such as a road 602 and fields 604.

Figure 7:
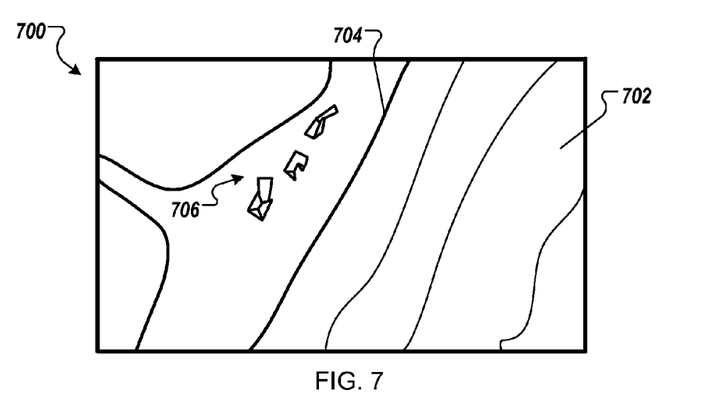

FIG. 7 illustrates an example of imagery 700 associated with a disaster area. For example, the imagery 700 can include physical features such as a body of water 702, a coastline 704, and building structures 706.

In some implementations, computer vision techniques may be used to determine physical features based on imagery. For example, the feature identifier 126 (shown in FIG. 1) can execute algorithms based on such techniques to identify features included in the examples of imagery illustrated in FIGS. 2-7. In some implementations, locations may be classified based in part on features included in imagery associated with the locations. For example, the location classifier 124 (shown in FIG. 1) can perform location classification.

In some implementations, imagery information may be integrated with information from geographic mapping databases such as Topologically Integrated Geographic Encoding and Referencing system (TIGER) databases, weather service databases, or other appropriate sources of information to determine imagery features and/or to classify locations. For example, commercial development features (e.g., parking lots, shopping malls), residential development features (e.g., houses, lawns, swimming pools), agricultural development features (e.g., fields), recreation development features (e.g., baseball diamonds, tennis courts, park benches), and transportation development features (e.g., roads, bridges, airports) can be identified using computer vision techniques, or can be identified by integrating computer vision information with additional information.

Figure 8:
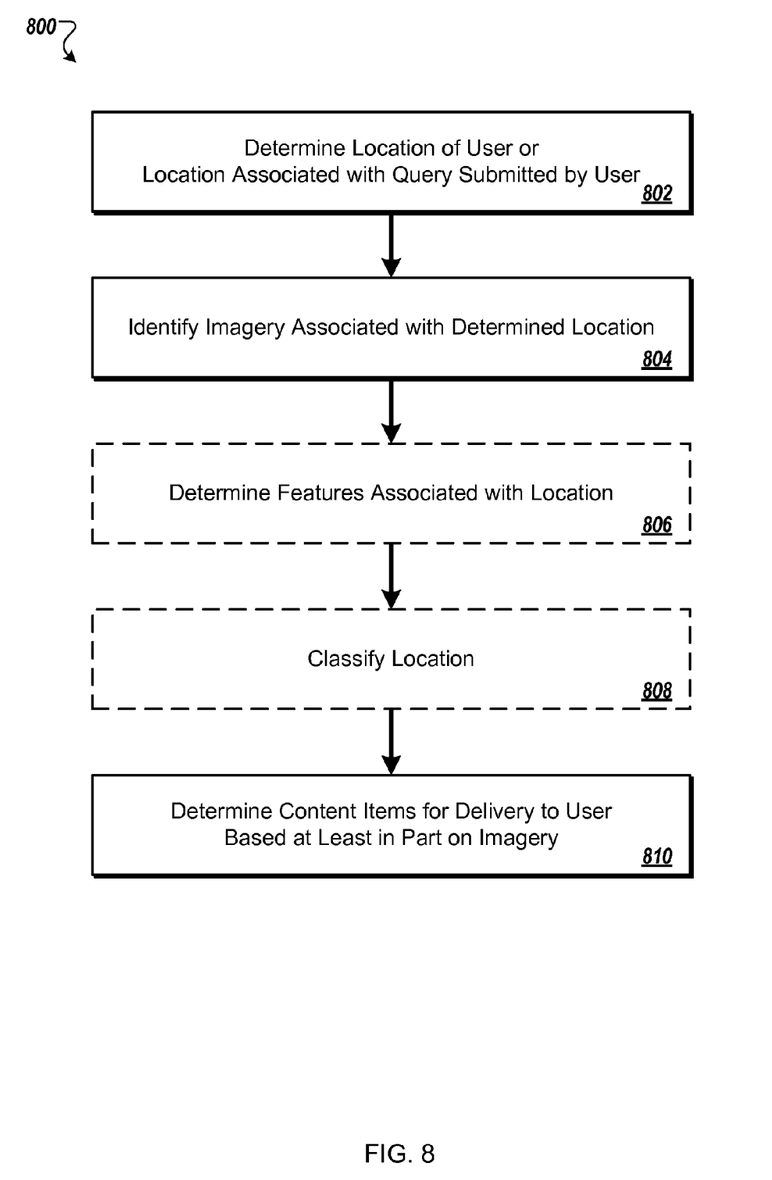
FIGS. 8 and 9 are flowcharts of example processes for determining content for delivery to users based on imagery.

FIG. 8 is a flowchart of an example process 800 for determining content for delivery to users based at least in part on imagery. In some implementations, the process 800 may be performed by the system 100 (shown in FIG. 1), and will be described as such for the purpose of clarity. Briefly, the process 800 can include determining a location of a user or a location associated with a query submitted by the user; identifying imagery associated with the determined location; determining features associated with the location; classifying the location; and determining content items for delivery to the user based at least in part on the imagery.

A location of a user or location of interest (e.g., a location associated with a query submitted by the user) can be determined (802). For example, the location identifier 120 can determine the current location of the user 104a, can determine the location of the user's home or workplace (e.g., based on past location information associated with the user 104a, or based on directly provided information), and/or can determine locations associated with queries submitted by the user 104a.

In some implementations, the location of the user may be a location associated with a device employed by the user. For example, the user 104a can employ the client computing device 102a to execute various applications, such as web browsers, communications applications, and media applications. User location information can be provided, for example, by GPS capabilities of the client computing device 102a, through a user location reporting application executed by the device 102a, or by another appropriate technique. In some implementations, the location of the device may be inferred based on an IP (Internet Protocol) address of the device. For example, the location identifier 120 can associate an IP address of the device 102a (and the operating user 104a) with an approximate location.

In some implementations, locations associated with queries submitted by users may be included in query terms of the submitted queries. For example, the user 104a can use the client computing device 102a to submit a search query for "San Francisco entertainment". In the present example, the location identifier can parse the query terms of the submitted query and can determine that the query is associated with the location of San Francisco.

Imagery associated with the determined location can be identified (804). For example, the imagery identifier 122 can access the imagery data store 130 to identify such imagery. As another example, imagery from imagery collection devices 106 can be identified in real-time. Imagery, for example, can include satellite, aerial, and street view imagery, and may be based on information associated with visual and/or thermal images. Examples of imagery are illustrated in FIGS. 2-7.

In some implementations, identifying imagery associated with the determined location may include identifying historical imagery. For example, multiple sets of imagery data for various locations may be maintained by the imagery data store 130, and may be used for identifying changes (e.g., land use changes, weather condition changes, environmental changes, population changes) associated with the locations over various time periods (e.g., yearly, seasonal, monthly, weekly, daily, hourly).

In some implementations, one or more features associated with the location can be determined (806) based at least in part on the imagery. For example, the feature identifier 126 can use computer vision techniques, mapping database information, and/or weather service information to determine features. In some implementations, features may be physical features associated with the location. For example, features can include ruggedness, forestation, grass coverage, water coverage, snow coverage, commercial development, residential development, agricultural development, recreational development, and transportation infrastructure development.

In some implementations, the location can be classified (808). For example, the location classifier 124 can classify locations. Classifications, for example, may be based on factors associated with the location, such as physical features, current weather conditions, land use, population density, and environmental conditions. Classification can be performed by computer classification processes and/or human-assisted techniques, for example. In some implementations, geographic mapping database information and/or weather information can be integrated with imagery information to perform classification. For example, a beach may be classified as a warm-weather beach or a beach for good surfing based in part on weather-related information, such as temperature, wind speed, precipitation, and humidity.

In some implementations, the location may be classified based in part on features included in imagery associated with the location. For example, a location associated with imagery including an area of apartment buildings may be classified as having high population density. In some implementations, a location may have multiple classifications. For example, the area of apartment buildings may also include several theaters, and may be classified as an entertainment district having high population density. In some implementations, classifications may be binary. For example, a beach may be classified as public or private. In some implementations, classifications may be continuous. For example, in contrast to a binary classification (e.g., "forested" or "not forested"), an wildlife refuge may be classified as being nearly completely forested, a park may be classified has having partial tree coverage, and an urban area may be classified as being mostly devoid of trees.

In some implementations, classification may include descriptive labeling. For example, referring to FIG. 4, locations associated with features such as large houses 402, well-manicured lawns 406, and swimming pools 408 may be associated with the label "upscale neighborhood".

One or more content items for delivery to the user can be determined (810), based at least in part on the imagery. For example, the content selector 128 can select content (e.g., text, images, audio, video, search results, recommendations, advertisements, etc.) based at least in part on imagery associated with the location, the classification of the location or labeling of the location.

In some implementations, determining one or more content items for delivery to the user may be based at least in part on location classification. Referring again to FIG. 4, for example, content providers (e.g., advertisers) may indicate certain content (e.g., targeted advertisements) to be provided to users located in, having a home in, or having submitted a query associated with an area classified as an "upscale neighborhood". In the present example, content may include advertisements related to lawn care services, swimming pool maintenance services, or other products or services that may be relevant to users located in or interested in the location.

In some implementations, determining one or more content items for delivery to the user may be based at least in part on one or more features associated with the location. Referring to FIG. 3, for example, the imagery 300 associated with a park includes features such as the baseball diamond 302, the tennis court 304, and the group of picnic benches 312. In the present example, content providers may indicate content to be provided to users located in or interested in a location associated with such features. For example, users having submitted queries (or map searches) for parks including baseball diamonds may be provided with content associated with baseball equipment. As another example, users indicating an interest in a park including a tennis court feature may be provided with content associated with tennis lessons or gear. As another example, users indicating an interest in a park with picnic benches may be provided with content related to picnicking and barbeques.

In some implementations, one or more features associated with a location of interest to a user may be used to infer characteristics of the user, and content items for delivery may be determined based at least in part on the inferred characteristics. For example, a park of interest to a particular user may include playground equipment features (e.g., swings, slides, see-saws, etc.). In the present example, an inference may be made that the user has children. Thus, in the present example, content that may be of interest to users with children, such as information related to child care services, toys, etc., may be selected for delivery to the user.

In some implementations, determining one or more content items for delivery to the user may be based at least in part on comparing imagery associated with various time periods. Referring to FIG. 7, for example, the imagery 700 associated with a disaster area may be compared with previous imagery associated with the area. Changes to building structures 706 may indicate structural damage, for example. In the present example, users located in or interested in the area may be provided with information associated with disaster relief services, or advertisements related to insurance, construction, or relocation services.

In some implementations, determining one or more content items for delivery to the user may include determining one or more content items that have been selected for delivery to users associated with similar locations. Referring to FIG. 2, for example, the imagery 200 associated with a mountainous region may be similar to imagery associated with other such regions. For example, other regions may include features similar to features included in the imagery 200, such as rugged, snow covered areas 202, valleys 206, and streams 204. In the present example, if other users located in or interested in locations similar to the mountainous region have expressed interest in (e.g., as indicated by link clicks, page views, or some other appropriate metric) particular content items (e.g., weather reports, mountain climbing equipment), the content items can be selected for delivery to a user located in or interested in the mountainous region associated with the imagery 200.

Figure 9:
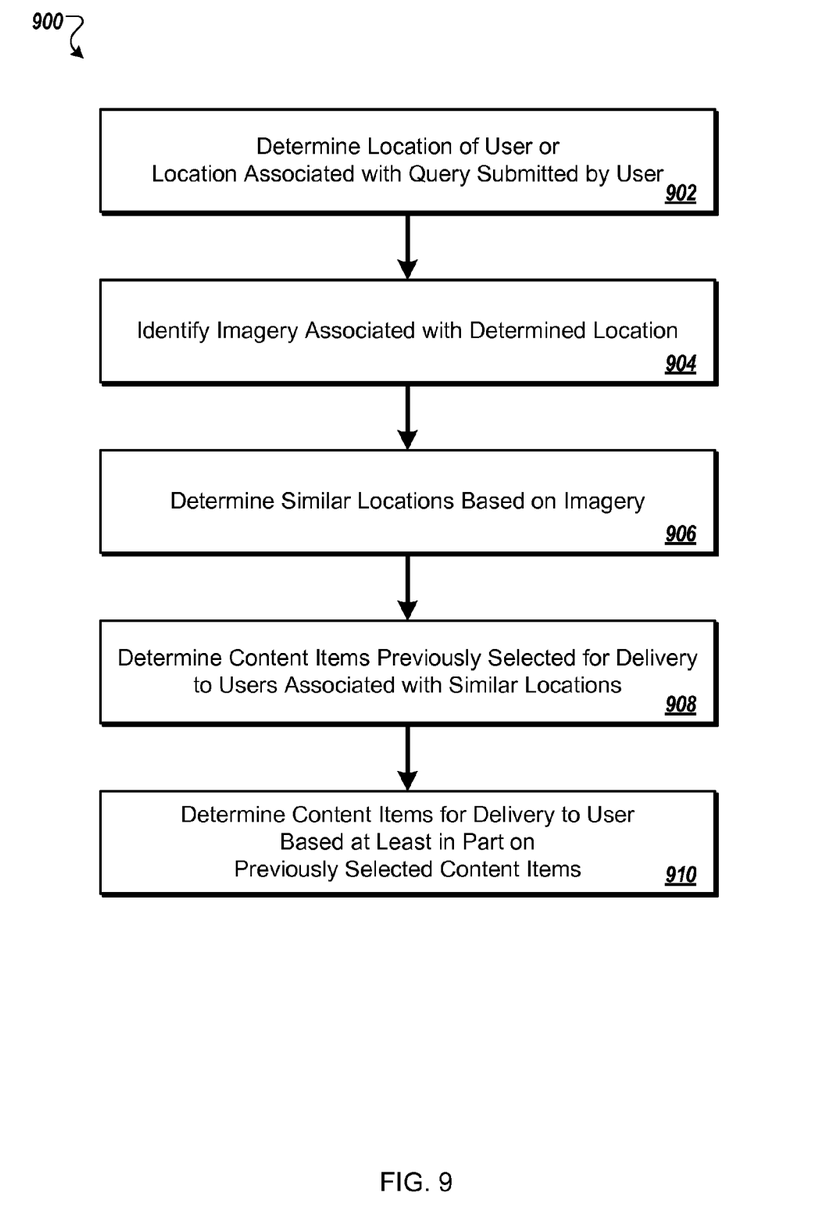

FIG. 9 is a flowchart of an example process 900 for determining content for delivery to users based at least in part on imagery. In some implementations, the process 900 may be performed by the system 100 (shown in FIG. 1), and will be described as such for the purpose of clarity.

A location of a user or a location of interest (e.g., a location associated with a query submitted by the user) can be determined (902). For example, the location identifier 120 can determine the location of any of the users 104, and/or can determine locations associated with queries submitted by the users 104. Imagery associated with determined locations can be identified (904). For example, the imagery identifier 122 can identify imagery associated with locations, including satellite, aerial, and street view imagery, based on information associated with visual and/or thermal images.

One or more similar locations can be determined (906) based on the imagery. In some implementations, determining one or more similar locations may be based on part on imagery features. Referring to FIG. 5, for example, the imagery 500 associated with a commercial area may include features such as commercial buildings 502 and parking lots 504. Other areas may be determined as being similar, for example, based on a similarity of features, such as similarly-sized buildings, similar parking lot arrangements, similar numbers of cars in the parking lots, or another suitable comparison.

In some implementations locations having similar imagery features may be determined to be similar. In some implementations, determining one or more similar locations may include classifying the location, classifying one or more similar locations, and comparing the classifications. Referring to FIG. 6, for example, an agricultural area associated with the imagery 600 may be classified as "agricultural", "having dirt roads", "mainly orchards", "harvesting season", and/or some other appropriate classification. Locations with similar classifications may be determined to be similar, for example, based on a nearness of the classifications. For example, if another agricultural area is associated with the classifications of "agricultural", "having dirt roads", "mainly orchards", and "harvesting season", the area may be determined to be similar to the area associated with the imagery 600. As another example, if another agricultural area is associated with the classifications of "agricultural", "having gravel roads", "some orchards", and "growing season", the area may or may not be determined to be similar to the area associated with the imagery 600, based on specified nearness thresholds.

In some implementations, classifying may be performed by a computer. For example, the location classifier 124 (shown in FIG. 1) can use computer vision techniques to identify patterns associated with fields 604 used for growing various types of crops. In some implementations, classifying may be performed by a user associated with the location. For example, users with knowledge of the area associated with the imagery 600 may provide one or more classifications for defining the area.

One or more content items previously selected for delivery to users associated with the one or more similar locations can be determined (908). For example, information associated with content items previously selected for delivery to users 104 can be maintained by the content data store 132. Such information can include information associated with content types (e.g., media format, message structure, etc.) delivered to users, particular content items delivered to users, and user interaction (e.g., click rates, view times, etc.) with such content types and items. The identification of items previously delivered to a specific user or other users can be made based on historical information that is maintained by the system. Users may, for example, opt in to the collection and storage of such information.

One or more content items for delivery to the user can be determined (910), based at least in part on the one or more content items previously selected for delivery to users associated with the one or more similar locations. For example, the content selector 128 can select content items for delivery to the user 104a, based at least in part on content items previously selected for delivery to the user 104n. In the present example, the user 104a may be associated with (e.g., may be located in or have a home or workplace in) an agricultural area including orchards. The content selector 128, for example, may determine that the user 104n is associated with a similar location (e.g., another agricultural area including orchards), that certain content items (e.g., advertisements for harvesting equipment) were selected for delivery to the user 104n, and that the user 104n had indicated a preference (e.g., based on clicks, views, shares, etc.) for the content items. Thus, for example, the content selector 128 may select for delivery to the user 104a the content items previously selected for delivery to the user 104n.

As another example, the user 104a may submit a query associated with a location classified as a "budget shopping center". In the present example, the content selector 128 may determine that other users having submitted queries associated with similarly classified locations (e.g., other "budget shopping centers") may have indicated preferences for certain content, such as electronic coupons, information related to traffic conditions between their current location and the location of interest, or some other sort of content. Thus, for example, the content selector 128 may select for delivery to the user 104a content items of similar types (e.g., coupons, customized traffic information, etc.) as content items delivered to other users.

Figure 10:
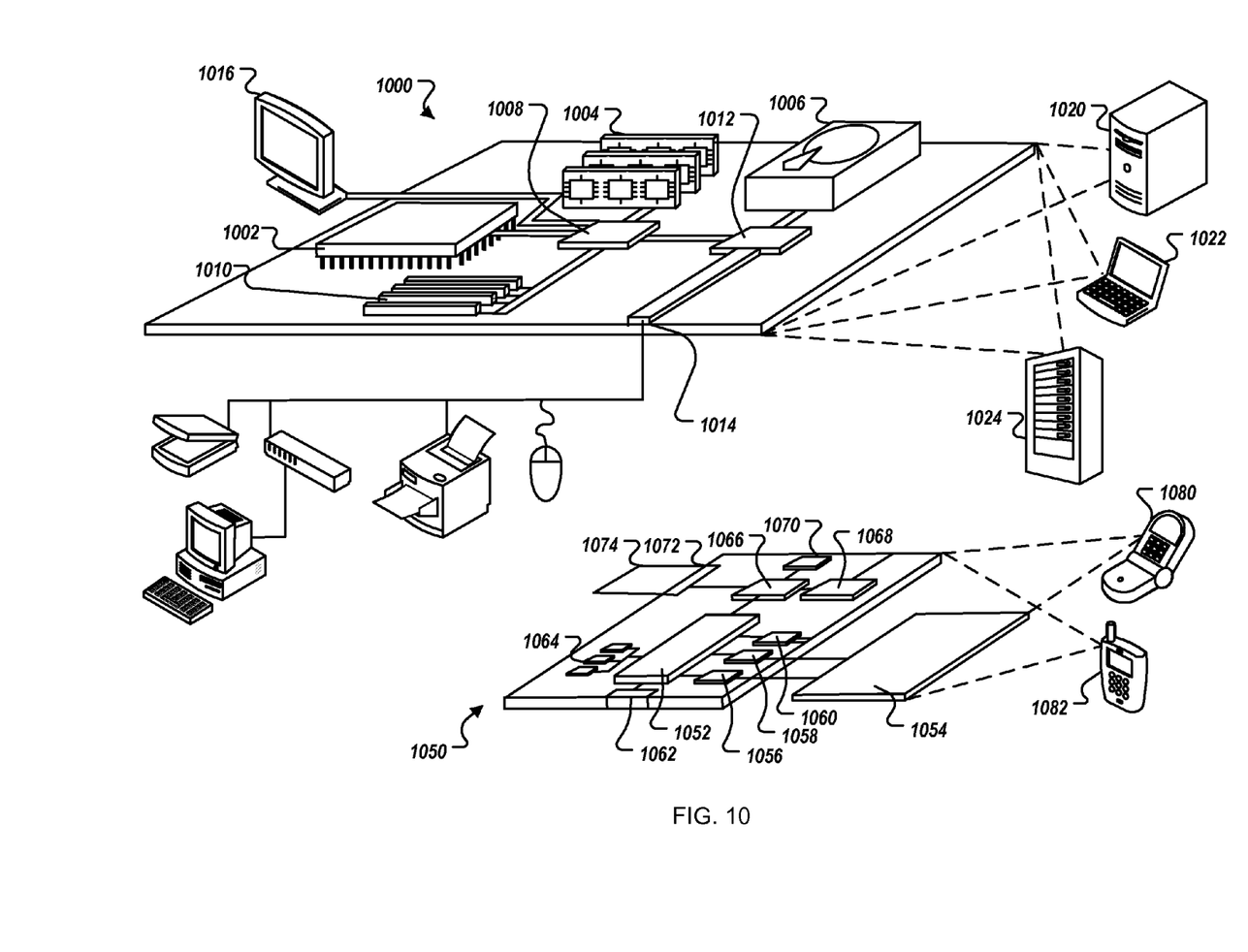
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    determining, by one or more computing devices, a location associated with a user in response to a query from the user;
    identifying, by the one or more computing devices, imagery associated with the determined location, wherein the imagery includes one or more images captured from an area including the determined location;
    analyzing, by the one or more computing devices, the identified imagery to determine one or more physical features depicted in the identified imagery, the one or more physical features associated with the determined location; and
    determining, by the one or more computing devices, one or more content items for delivery to the user based at least in part on the determined one or more physical features.

2. The method of claim 1 wherein the imagery comprises at least one of satellite imagery or aerial imagery.

3. The method of claim 1 wherein the imagery is street view imagery.

4. The method of claim 1 wherein the imagery is thermal imagery.

5. The method of claim 1 wherein the location associated with the user comprises a location associated with a query submitted by the user, wherein the location associated with a query is a location that is included in query terms of the query.

6. The method of claim 1 wherein the location associated with the user comprises a location of the user, wherein the location of the user is a location associated with a device employed by the user.

7. The method of claim 6 wherein the location of the device is inferred based on an internet protocol address of the device.

8. The method of claim 1 wherein identifying imagery associated with the determined location includes identifying historical imagery from a plurality of time periods and wherein determining one or more content items is based at least in part on comparing the historical imagery associated with two or more of the plurality of time periods.

9. The method of claim 1 wherein determining one or more content items includes determining one or more advertisements for delivery to the user.

10. The method of claim 1 wherein analyzing the identified imagery to determine one or more physical features depicted in the identified imagery comprises using computer vision techniques.

11. The method of claim 1 wherein the one or more physical features include features selected from the group of ruggedness, forestation, grass coverage, water coverage, snow coverage, commercial development, residential development, agricultural development, recreational development, or transportation infrastructure development.

12. The method of claim 1 further comprising:
    determining one or more similar locations as the location based on the imagery;
    determining one or more content items previously selected for delivery to users associated with the one or more similar locations; and
    wherein determining the one or more content items for delivery to the user is based at least in part on the one or more content items previously selected for delivery to users associated with the one or more similar locations.

13. The method of claim 12 wherein determining one or more similar locations includes classifying the location, classifying the one or more similar locations, and comparing the classifications.

14. The method of claim 13 wherein classifying is performed by a user associated with the location.

15. The method of claim 13 wherein classifying is performed by a computer.

16. The method of claim 1 further comprising classifying the location and wherein determining one or more content items for delivery includes determining one or more content items that have been selected for delivery to users associated with similar locations.

17. The method of claim 1 further comprising classifying the location and delivering one or more content items based on the classification.

18. The method of claim 17 wherein the classification is based on one or more of current weather conditions associated with the location, land use associated with the location, population density associated with the location, or environmental conditions associated with the location.

19. A system comprising:
- a targeting system implemented casing one or more processor-based, devices for targeting content to users, the targeting system including a location identifier, an imagery identifiers, a feature identifier, and a content selector;
- wherein the location identifier is enabled to determine a location associated with a user in response to a query from the user;
- wherein the imagery identifier is enabled to identify imagery associated with the determined location, wherein the imagery includes one or more images captured from an area including the determined location;
- wherein the feature identifier is enabled to analyze the identified imagery to determine one or more physical features depicted in the identified imagery, the one or more physical features associated with the determined location; and
- wherein the content selector is enabled to determine one or more advertisements for delivery to the user based at least in part on one or more physical features determined by the feature identifier.

20. A device comprising:
a processor that is configured to:
- determine a location associated with a user;
- identify imagery associated with the determined location;
- analyze the identified imagery to determine one or more physical features depicted in the identified imagery, the one or more physical features associated with the determined location; and
- determine one or more content items for delivery to the user based at least in part on the one or more physical features.

* * * * *

UNITED STATES PATENT AND TRADEMARK OFFICE
CERTIFICATE OF CORRECTION

PATENT NO.        : 9,098,529 B1
APPLICATION NO.   : 13/115438
DATED             : August 4, 2015
INVENTOR(S)       : Seth et al.

It is certified that error appears in the above-identified patent and that said Letters Patent is hereby corrected as shown below:

Claims
Column 15, Line 25, Claim 19, after the word "implemented" please delete "casing" and insert --using--.

Signed and Sealed this
Twenty-sixth Day of July, 2016

Michelle K. Lee
*Director of the United States Patent and Trademark Office*